Feb. 13, 1940.  J. L. HIPPLE  2,190,359
TRACTOR ATTACHMENT
Filed Jan. 21, 1937    4 Sheets-Sheet 1

Fig. 1

Inventor
James L. Hipple.
By [signature]
Atty.

Feb. 13, 1940.                J. L. HIPPLE                2,190,359
                          TRACTOR ATTACHMENT
                        Filed Jan. 21, 1937            4 Sheets-Sheet 3

Inventor:
James L. Hipple
By [signature]
    Atty.

Patented Feb. 13, 1940

2,190,359

UNITED STATES PATENT OFFICE 2,190,359

TRACTOR ATTACHMENT

James L. Hipple, Canton, Ill., assignor to International Harvester Company, a corporation of New Jersey Application January 21, 1937, Serial No. 121,506

15 Claims. (Cl. 111—59)

This invention relates to farm implements and is directed more particularly to implements of the class adapted for attachment to and operation in conjunction with tractors.

The principal object of the invention is to provide means for converting farm tractors of the general purpose type, or other motor propelled wheel supported frame types, into efficient tractor planters when desired, and to produce a tractor planter structure in which the planter units will be positioned to the rear of the tractor and at each side of the center line of the tractor, and also to position the fertilizer depositing mechanism or fertilizer attachment for the planter units ahead of the planter units and at each side of the forward portion of the tractor body. The fertilizer units of the fertilizer attachment and the planter units of the planter attachment are to have their controls so positioned as to be conveniently within the reach of the operator's station.

A further object is to provide a structure that will be easily attachable to, and detachable from existing types of tractors, and that will provide the desired arrangement of the planters and fertilizer units, and also will include means for governing the operation of the planting elements and fertilizing elements when the structure is in position on the tractor.

The foregoing and other minor objects have been obtained by the provision of a structure having for its characteristic features of construction a transverse frame member, attachable at its center to the mid-portion of the tractor, to which are trailed therefrom the planter units by parallel link draft connections for the planter units mounted underneath the tractor frame. The planter units are so mounted as to be adjusted laterally on the transverse draft member, if desired, and the transverse draft member has its ends extending laterally beyond the sides of the tractor body, for the purpose of obtaining a maximum adjustment of the planter units with respect to row widths. The fertilizer attachment structure is so mounted as to be readily attached to the frame of the tractor, and the fertilizer furrow opener structure is connected by parallel draft links to a transverse draft member extending across the front of the tractor, and laterally to each side of the tractor so that the fertilizer furrow openers may be adjusted, in the same manner, laterally as the plant units. The usual marker construction, in this instance, is mounted intermediate the front and rear ends of the tractor, and is connected to the front transverse draft member. The adjusting mechanism for the fertilizer attachment units, and the planter units are mounted on the rear of the tractor within convenient reach of the operator's station.

The invention, accordingly, resides in the organization and details of construction, or equivalents thereof, hereinafter more particularly described, and then defined in the claims.

Referring to the drawings.

In the present instance, the invention is illustrated as including a tractor known as the general purpose or tri-cycle type having a comparatively narrow longitudinal body frame or body portion 10 supported on a rear axle housing structure 11 in which are journaled axles 12, to which are adjustably secured wheels 13. The wheels 13 are so positioned as to span two plant rows, and are adjusted to ride in the furrows between the rows. The forward end of the tractor body 10 is supported on a single centrally positioned steering truck 14. The steering truck is steered, in the usual manner, by a steering wheel 15, adjacent an operator's station 16.

The structure of the planting attachment, which is one of the main objects of the invention, comprises a plurality of planting units 17 and 18 positioned to the rear of the tractor and having their draft connections extending forwardly underneath the tractor to a point intermediate the front and rear ends of the tractor. As the planting units 17 and 18 are similar in construction, only one unit will be described and like reference characters will denote similar parts. The planting units 17 and 18, however, are of opposite hands.

Figure 1:
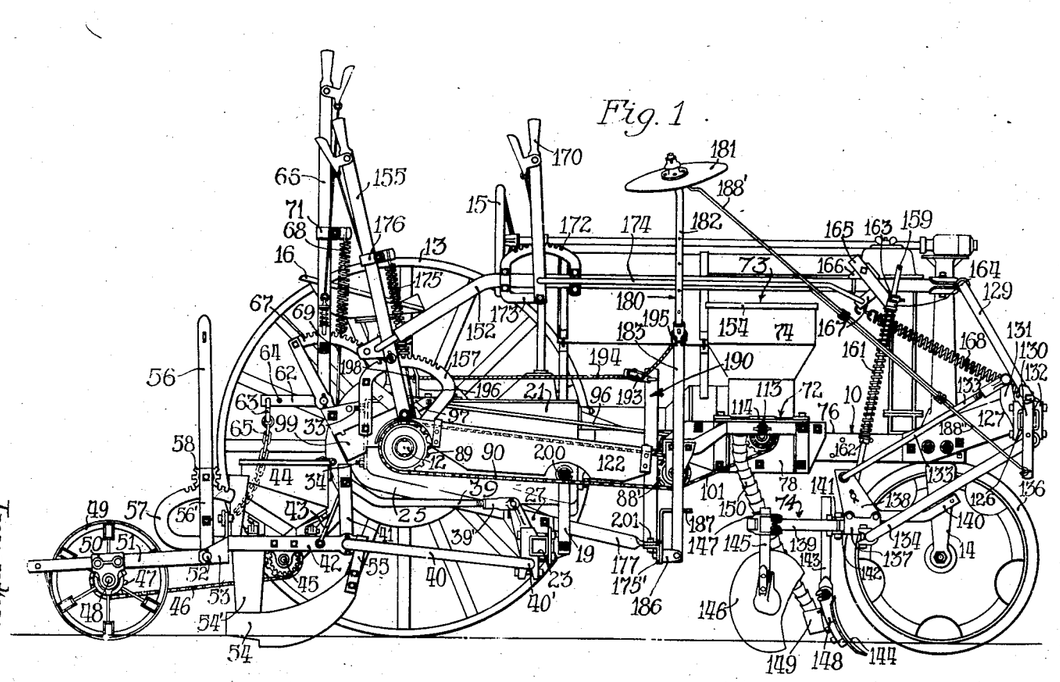
Figure 1 is a side elevation of the planter and fertilizer mechanism, as applied to a general purpose type of tractor of the tri-cycle type which has its right rear wheel removed to show the drive mechanism.
Figure 2:
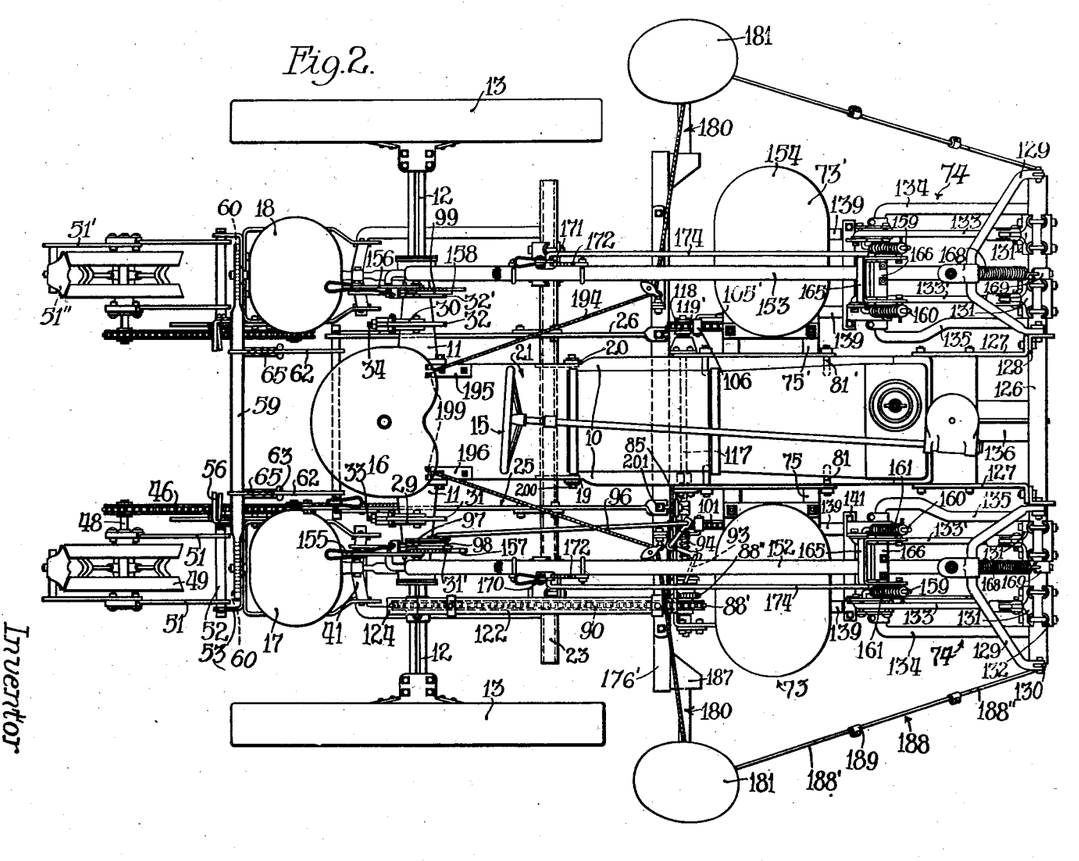
Figure 2 is a plan view of the planter attachment, as shown in Figure 1.
Figure 6:
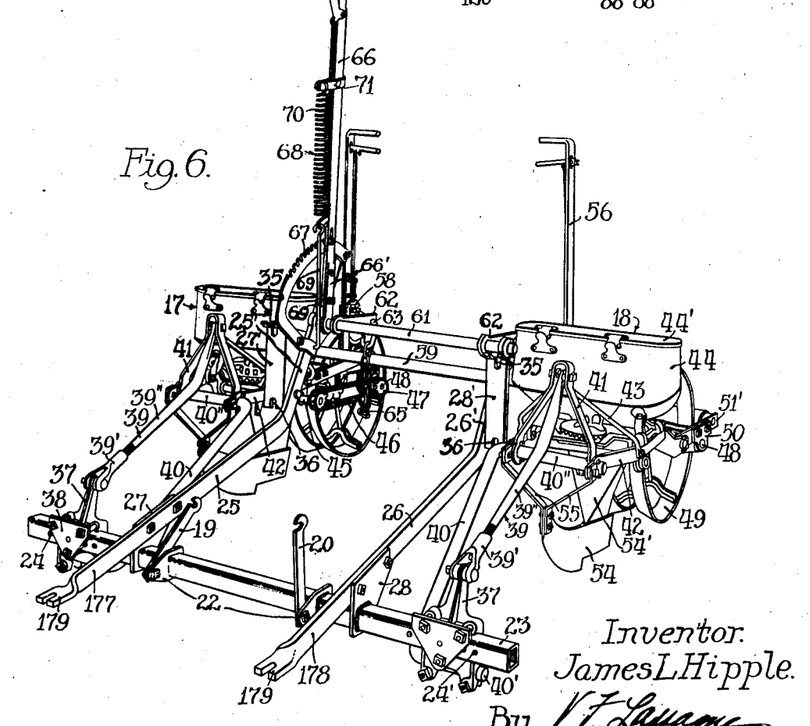

Detachably connectible to the underneath portion of the tractor, intermediate the front and rear ends of the tractor, are downwardly extending planter attachment supporting members 19 and 20, as best shown in Figures 1, 2 and 6. The supporting members 19 and 20 are spaced apart laterally, and secured to the sides of the transmission housing 21 of the tractor. The supporting members 19 and 20 are pivotally secured at their lower end to brackets 22, welded or otherwise secured to a transverse draft member or transverse draft means 23 in the form of a square tube. The transverse draft member 23 extends laterally on each side of the narrow longitudinal body frame 10 of the tractor and has a plurality of adjusting holes 24 and 24' for the purpose of adjustably positioning the planter units 17 and 18 for various row spacings.

The transverse draft member 23 is supported from the rear axle housing 11 of the tractor by thrust members 25 and 26 which carry in compression the forces transmitted thereto from the transverse draft member 23. The thrust members 25 and 26 extend forwardly and downwardly underneath the rear axle housing 11 of the tractor, as best shown in Figures 1 and 6. At their lower ends, brackets 27 and 28 attach the draft member 23 to these thrust members. The brackets 27 and 28 are welded, or otherwise secured to the draft member 23. At their rear ends, the thrust members 25 and 26 extend upwardly and rearwardly of the rear axle housing 11, as best shown in Figure 1. The rear end 25' of the thrust member 25 has bolted thereto, or otherwise secured, as best shown in Figure 6, a supporting bracket 27' which is of the quick attachable and detachable type. Similarly the rear end 26' of the thrust member 26 has bolted thereto, or otherwise secured, an attaching bracket 28' which is also of the quick attachable type.

As best shown attached to the tractor in Figures 1 and 2, the attaching and detaching brackets 27' and 28' are supported from coupling members 29 and 30 respectively. The coupling members 29 and 30 are bolted to flanges 31 and 32 which are integral with the axle housings 11. The attaching brackets 27' and 28' are securely attached to the coupling members 29 and 30 by swinging bolts 33 and 34 which are swung respectively through slots 35 and 36 of the brackets 27' and 28', and which are best shown in Figure 6.

It should thus be obvious from the foregoing descriptions, that the frame structure comprising the members 25 and 26 forms the front draft connections for the planter units to rigidly support the same on the tractor. The supporting members 19 and 20 are used mainly to support the weight of the transverse draft member 23, although it is obvious that other stresses may be transferred through these members to the frame of the tractor.

Mounted for lateral adjustment on the transverse draft member 23 are draft connecting brackets or members 37 for each of the planter units 17 and 18. Each of the draft connecting brackets 37 is securely clamped to the transverse draft member 23 by a triangular shaped clamping plate 38, and its attaching bolts. This construction is best shown in Figures 1 and 6. The draft connecting bracket 37 extends upwardly above the draft member 23, and below the draft member 23. At the upper and lower ends of the draft connecting bracket 37 are pivotally mounted an upper draft link 39 and a lower draft link or longitudinally extending draft means 40 respectively. The upper draft link 39 comprises a forward portion 39' which is pivoted to the draft connecting bracket 37, and which is in threaded engagement with a rear portion 39" of the upper draft link 39 for the purpose of adjustment. The draft link 39 extends rearwardly and upwardly, as best shown in Figures 1 and 6, to where its rear portion 39" is pivotally connected to a hair pin shaped bracket 41. The lower draft link 40 has a forward portion 40' laterally extending and pivotally mounted in the draft connection bracket 37. The draft link 40 then extends rearwardly and inwardly, and it is then bent outwardly as at 40" to form a draft connection for the frame of the planter units, as best shown in Figures 6 and 7. It is thus obvious, that a draft connection has been formed for each planter unit in which the connection is in the form of a parallel link connnection wherein any movement of the planter unit as it follows the ground will maintain the furrow opening device of the planter unit always in the same relation with the gaging member for the planter unit. In addition, due to the shape of the lower draft link 40, through which all of the draft forces of the planter unit pass, there is provided means at its front and rear ends for stabilizing each of the planter units to prevent any tipping of the planter units. The hair pin shaped brace 41 is pivotally mounted on the laterally extending portion 40" of the lower draft link 40. The portion 40" of the lower draft link is pivotally mounted in the forward end of a planter frame 42. The hair pin shaped brace 41, to which the upper draft link 39 is pivotally attached, is supported in its upright position by braces 43 which are secured at their lower ends to the planter frame 42. The upper link 39 is adjustable so that it may be adjusted to have the same distance between centers as the distance between the axes of the laterally extending portions of 40' and 40" of the lower draft link 40. This is done so that the frame 42 of the planter units will rise and fall in such a manner that each position of the planter frame and its attached parts will be parallel to their previous position, as the planter covering wheel passes over any irregularities in the contour of the ground.

Attached to the planter frame 42 for each of the units 17 and 18 is a seed hopper 44. The seed hopper is of the type well known in the planter art, as disclosed in the patent to Kriegbaum et al., No. 2,017,759, granted October 15, 1935. The seed dispensing mechanism is driven from a drive mechanism comprising a transverse shaft 45 mounted on the planter frame 42. The transverse shaft 45 is driven by a chain 46 which is driven from a sprocket 47 secured to an axle 48 of a covering wheel or gauge means 49. The chain 46 and its adjacent members provides means for driving the aforesaid dispensing mechanism.

The covering wheel 49 is supported on brackets 50 which are secured to rearwardly extending covering wheel frame members 51. The covering wheel frame members 51 are welded, or otherwise secured to a transverse draft member 52 journaled in a U-shaped bracket 53 secured to the rear portion of the planter frame 42. The covering wheel 49, which also acts as a gauging means for a furrow opener shoe or unit 54 which is secured to the planter frame 42 at its forward end by downwardly extending brackets 55 pivotally mounted to the planter frame 42, is adjusted by a lever 56 or means for adjusting the gauge means extending to within reach of the operator's station 16. The lever 56 is attached to an upwardly extending arm 56' which is welded, or otherwise secured to the transverse draft member 52. The lever 56 is adjusted about an adjusting quadrant 57 which is secured to the planter frame 42. A fine adjustment of the gage wheel may be secured by an adjustable detent 58 which is pivotally mounted on the lever 56. The planting units 17 and 18 are held apart in their lateral spacing by a transverse bedding or spacing bar 59 which is pivotally attached to the brackets 53 of each of the units 17 and 18. As the spacing bar 59 is pivotally attached to each of the units 17 and 18, each of the units is free to rise and fall with respect to each other, and to the tractor frame. The transverse spacing bar 59, which provides means for connecting the units together to prevent lateral movement with respect to each other but permitting independent vertical movement with respect to each other, is provided with adjusting holes 60, so that the units may be spaced apart for various row spacings.

Journaled in the upper ends 25' and 26' of the thrust members 25 and 26 is a transverse rockshaft 61. Welded, or otherwise secured to the rockshaft 61 are rearwardly extending lifting arms 62, and attached to the lifting arms 62 are chain hooks 63. The chain hooks 63 may be adjusted on the lifting arm 62 by means of adjusting holes 64. Chains 65 extend downwardly from chain hooks 63 to where they are attached to the bedding bar 59. Additional adjustment may be provided by hooking the chains over the chain hooks 63, so that the number of links in a chain between the chain hook and the spacing bar are increased or decreased depending upon whether the planter is to plant shallow or deep. The chains 65 also provide a lost motion connection between the planter units and the lifting arms.

The planter units 17 and 18 are raised and lowered from transport position to ground engaging position, as shown in Figure 2, by means of a master lever 66 which comprises with its adjacent members means for raising and lowering the planter units from ground engaging to transport position. The master lever 66 is secured to an upwardly extending arm 66' which is welded, or otherwise secured to the transverse rockshaft 61. The adjusting lever 66 is adjusted about an adjusting quadrant 67 which is secured to the rear end 25' of the thrust member 25. As the lever 66 is moved forwardly to raise the planter units, a counter-balancing mechanism 68 acts to counter-balance the weight of the planter units 17 and 18. The counter-balancing mechanism comprises a link 69 pivotally attached at its lower end to a portion of the adjusting quadrant 67, and at its upper end to a tension spring 70 which in turn is supported from the lever 66 by a bracket 71. It is obvious that as the lever 66 moves forward that the tension in the spring 70 acts to help lift the planter units, thus forming a resilient means for counter-balancing the weight of the planter units.

In the planter construction previously described, it is obvious that a simple planter attachment has been provided in which a plurality of planter units may be connected to the tractor so that the planter furrow openers 54 are as close as possible to the axis of the rear wheels of the tractor to follow the contour of the ground. In addition, each of the planting units is provided with parallel draft link connections, so that each planter unit follows uniformly the motion of the covering wheels as the covering wheels follow the contour of the ground. The covering wheels also perform the function of gaging means for each planter unit, and the depth of the furrow opener shoe 54 may be adjusted relatively to the covering wheel to increase or decrease the depth of planting in the operation of each of the planting units. Seed is placed in the hoppers 44 by raising a cover 44'. The seed depositing mechanism is driven from the gage wheel, or covering wheel 49 and as the seed plates in the hopper revolve in the usual manner, seed is deposited through a seed boot 54' to the furrow formed by the furrow opener 54. The seed boot 54' is secured to the furrow opener 54 in the usual manner. When the planter is ready to be raised from ground engaging position, as shown in Figures 1 and 2, to transport position, the lever 66 is moved forwardly and each of the planter units 17 and 18 are raised entirely from the ground. The draft links 39 are bowed, as best shown in Figure 1 and Figure 6, to provide clearance in the raised position of the planter units in transport, and to prevent the draft links 39 from engaging the rear axle housings 11. With this construction it is obvious that the planter units are free to rise and fall with respect to each other, as each of the units follow the contour of the ground, and while in their raised position permitted to be raised to their maximum height for transport.

Figure 4:
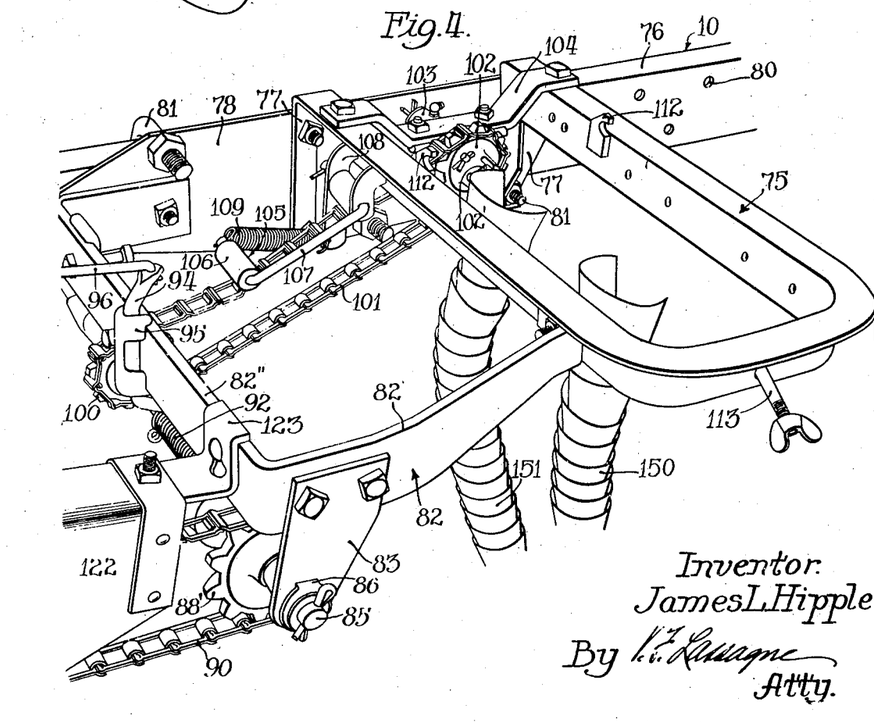
Figure 4 is a perspective view of the fertilizing drive mechanism, and support for the fertilizer hoppers attached to the tractor.
Figure 5:
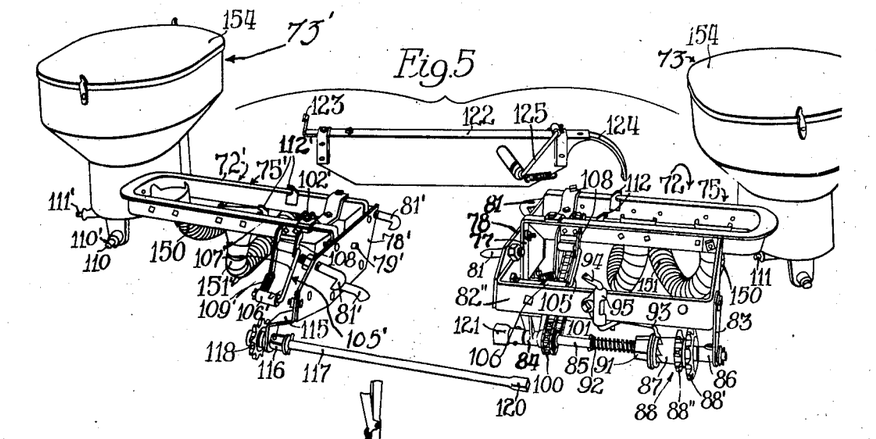
Figure 5 is a perspective view of the fertilizing drive mechanism, and hoppers detached from the tractor and placed on the ground; and, Figure 6 is a perspective view of the planter unit detached from the tractor.

Fertilizer units 72 and 72' of the fertilizer attachment for the tractor planter are mounted forwardly on the longitudinally extending narrow body frame 10 of the tractor. As each of the fertilizer units are substantialy similar, only one will be described, and primed reference characters will denote similar parts of the left-hand unit. It is obvious that various parts of these fertilizer units are right and left handed. The fertilizer unit 72 comprises the hopper mechanism 73 and the furrow opening mechanism or furrow forming structure 74. The fertilizer hopper mechanism is best shown in Figures 1, 2, 4 and 5. The fertilizer hopper or dispensing mechanism 73 comprises a hopper supported by a fertilizer supporting means or hopper frame 75. The detailed construction of the fertilizer hopper frame or means for mounting the aforesaid dispensing mechanism on the tractor is best shown in Figures 1, 4 and 5. In Figure 4, the fertilizer hopper frame 75 is shown secured in position to a side sill 76 of the narrow longitudinal frame 10 of the tractor. The frame 75 for the right fertilizer unit 72 is of U-shaped construction which extends laterally from the side of the tractor sill 76. The fertilizer frame 75 has a downwardly extending portion 77 which is secured to a longitudinally extending plate member 78. The longitudinally extending plate member 78 has a pin 79 which may engage one of the plurality of holes 80 in the side sill 76 of the tractor, as best shown in Figures 4 and 5. The plate 78, to which the U-shaped hopper frame 75 is attached, is quickly attached and detached from the side sill 76 of the tractor by clamp bolts 81 which provide means for quickly attaching and detaching the same to the tractor. A supporting member 82 has a forwardly extending portion 82' secured to the rear leg of the U-shaped hopper frame 75. A laterally extending portion 82'' extends inwardly to where it is secured to the rear end of the plate 78. Mounted on the supporting member 82 are downwardly extending bracket members 83 and 84, as best shown in Figures 4 and 5.

A transverse drive shaft or jack-shaft 85 is journaled in the bracket 84, and in a self aligning bearing 86 mounted in the bracket 83. The brackets 83 and 84 and adjacent parts provide means for supporting the jack-shaft on the aforesaid fertilizer hopper frame 75. Mounted on the shaft 85 is a clutch mechanism 87. The clutch mechanism or clutch means 87 comprises a dual sprocket member 88 having one sprocket 88', and another sprocket 88". The sprocket member 88, as best shown in Figure 5, is clutched into its driving position so that the shaft 85 may be driven, as best shown in Figures 1, 2 and 4, from the rear axle 12 of the tractor by means of a sprocket 89 secured to the axle 12, and by a chain 90 driving the sprocket 88' from the sprocket 89. A sliding clutch member 91 has tooth engaging portions engaging similar portions on the member 87. The member 91 is free to slide on the shaft 85, while at the same time, when it is engaged, as shown in Figure 5, to drive the shaft 85. The clutch member 91 is held in engagement with the member 87 by means of a compression spring 92. As best shown in Figures 2, 4 and 5, the clutch is thrown in and out of engagement by means of a clutch throw out link 93 actuated by a bell crank lever 94 which comprises the means for throwing the clutch means in and out of operation. The bell crank lever 94 is journaled in a bearing bracket 95 mounted on the laterally extending portion 82" of the supporting member 82. A clutch throw out rod 96, as best shown in Figures 1, 2 and 4, which is pivotally connected at its front end to the bell crank lever 94, extends rearwardly to within reach of a lever 97, as best shown in Figures 1 and 2, for actuating the throw out clutch mechanism. The clutch throw out lever is so formed that, as shown in its position in Figures 1 and 2, the clutch member 91 is thrown out of engagement from the member 87. When the lever 97 is pulled back, as shown in Figure 2, it forms an over the center lock to prevent the teeth of the clutch member 91 from engaging the teeth of the clutch member 87. The lever 97 is pivotally mounted on a bracket 98 which in turn is secured to a quadrant supporting bracket 99. The quadrant supporting bracket 99 is secured to a flange 31' which is integral with the axle housings 11, and is similar to the flange 31, previously described.

It is, therefore, obvious that upon throwing the throw out lever 97 forwardly that the clutch member 91 will engage the clutch member 87, and as the tractor moves forwardly, the fertilizer drive mechanism is driven through the transverse drive shaft 85 by means of the sprocket 89 secured to the axle 12 and by the chain 90. The shaft 85 is in the form of a jackshaft. The fertilizer distributing mechanism of the right fertilizer unit 72 is driven from the jackshaft 85 by means of a sprocket 100 secured thereto, and a forwardly extending chain 101 which provides means for driving the aforesaid driving means 102 from the jackshaft 85, as best shown in Figure 4. A driven sprocket 102 or means for driving the dispensing mechanism is mounted on a stub shaft which is journaled in a bearing 103. The transverse drive shaft 85 and its adjacent parts comprise means for driving the drive means from the motor of the tractor. The bearing 103 is supported from a longitudinally extending bearing supporting brace 104. The bearing supporting brace 104 is supported from the legs of the U-shaped fertilizer frame 75.

The chain 101 is tightened by a chain tightener 105. The chain tightener 105 comprises a roller 106 mounted on an arm 107 which is pivotally mounted in a chain tightener bracket 108 which is secured to a leg of the fertilizer U-shaped frame 75, as best shown in Figure 4. The roller 106 of the chain tightener 105 is held in engagement with the chain 101 by means of a spring 109 connecting the link 107 with the bracket 108. The driven sprocket 102 has a bayonet portion or clutch element 102' which is engaged, as best shown in Figure 4, by a pin or clutch element 110' of a driven shaft 110 of the fertilizer hopper drive or operating mechanism 73.

The shaft 110 drives the usual distributing mechanism in the fertilizer hopper 73, in the usual manner. It is obvious that in the construction shown in Figures 1, 4 and 5, the fertilizer hopper 73 may be detached from the fertilizer hopper frame 75. This is made necessary because of the weight of the fertilizer hopper mechanism 73 in detaching the same from the tractor. It is necessary to have a plurality of parts, so that the weight of each part may not overtax the strength of the operator in removing or attaching the parts of the tractor.

When the fertilizer hopper frame 75 has been attached to the side sill of the tractor, as best shown in Figure 4, the hopper 73 is placed on the frame, so that lugs or complementary members 111 engage slotted members or attaching means 112, as best shown in Figures 4 and 5. The foregoing structure provides means for quickly attaching and detaching the aforesaid hopper construction to the hopper frame 75. However, it is necessary to align the pin 110' with the bayonet portion 102' of the sprocket 102, which provides means for quickly attaching and detaching the aforesaid driving or operating mechanism of the hopper construction to the drive means for dispensing mechanism, before the lugs or complementary members 111 thoroughly abut the members 112. A clamp bolt 113, as best shown in Figures 1 and 4, engage a downwardly extending member 114 to clamp the hopper 73 in position.

As best shown in Figures 2 and 5, the left hand fertilizer unit 72' is mounted on the tractor in the same manner as the right hand unit 72, previously described. As like reference characters denote similar parts, and as the fertilizer hopper frame 75' for the left hand hopper 73' is similar to the fertilizer hopper frame 75, previously described, this construction for the left hand unit will only be described as to the means for connecting and driving the left hand unit from the right hand unit. The left hand fertilizer hopper frame 75' is secured to the left hand side of the tractor in the manner previously described for the right hand fertilizer hopper frame 75.

The left hand fertilizer hopper frame 75' has secured to the rear end of its longitudinally extending plate member 78', as best shown in Figures 2 and 5, a downwardly extending bearing bracket 115. Mounted in the bearing bracket 115 is a self-aligning bearing 116. Attached to the outer end of a drive shaft 117, which is a continuation of the jackshaft 85, as best shown in Figures 2 and 5, is a sprocket 118. The sprocket 118 drives the sprocket 102', similar to that previously described, through a chain 119' similar to the chain 101. The chain 119' is tightened by a chain tightener 105', similar to that previously described. It is obvious, as shown in Figures 2 and 5, that as the U-shaped fertilizer hopper frame 75' is being attached to the left side of the tractor that the inner end of the shaft 117, which has a square end 120 formed thereon, is aligned with its complementary portion 121 secured to the inner end of the drive shaft 85 and the members 120 and 121 provide means for quickly attaching and detaching the shaft 117 to the shaft 85. It is, therefore, apparent that as the shaft 117 engages the portion 121 that a continuous shaft is formed for driving the left hand fertilizer unit from the right hand fertilizer unit. The shaft 117 is so positioned as to extend underneath the side sill 76 of the narrow longitudinal body frame 10 of the tractor.

As best shown in Figures 1, 2, 4 and 5, a chain drive shield 122 is mounted to enclose the drive chain 90. The chain drive shield 122 is secured at its forward end by the bracket 123 to the lateral extending portion 82'' of the supporting member 82. The chain drive shield 122 has a curved portion 124 at its rear end to guard the sprocket 89. A chain tightener 125 is mounted on the chain drive shield 122 to tighten a chain 90.

The furrow opening structures 74 and 74' for each of the fertilizer distributing units 72 and 72' are similar, and therefore, only one will be described, and primed reference characters of the unit on left will denote similar parts of the unit on the right side. It is obvious that a portion of each of the structures 74 and 74' are right and left handed.

Mounted on the forward portion of the longitudinal body frame 10 is a laterally extending transverse draft member 126 forming a forwardly mounted draft frame. The transverse draft member 126 extends laterally on each side of the narrow body frame of the tractor, and is supported by forwardly extending supporting brackets 127, detachably mounted on the front of the tractor. The brackets 127 are in compression when the tools attached to the transverse draft member or transverse draft means 126 are in their ground engaging position. The brackets 127 are secured at their forward ends to attaching brackets 128 welded, or otherwise secured to the transverse draft member 126. Bail shaped members 129 are pivotally mounted on each end of the draft member 126, and are pivotally attached at their inner ends to the bracket members 128, and at their outer ends to the brackets 130. Adjustably mounted on each end of the transverse draft member 126 are a plurality of draft connecting brackets 131. The draft connecting brackets 131 are adjustably clamped in position by clamp brackets 132, and their attaching bolts. The transverse draft member 126 is a square tube, and the brackets 131 and 132 are so shaped that they may be adjusted laterally on the draft member 126. Parallel draft links or draft means 133, 134, 133' and 135 extend rearwardly and downwardly from the draft connecting brackets 131 and 132. The inner draft link 135, as best shown in Figure 2, is formed to provide clearance for a front wheel 136 of the tractor. The draft links 134 and 135 have at their upper ends laterally etending portions which are journaled in the draft connecting brackets 132. Similarly, at their lower ends are laterally extending portions which are journaled in beam clamp brackets 137. Attached to the beam clamp brackets 137 are upwardly extending plate members 138. Attached to the upper ends of the plate members 138 are the parallel links 133 and 133'. A cultivator beam 139 is mounted in each beam clamp bracket 137. Extending forwardly from the plate member, and the beam clamp bracket 137 is a cultivator shield support 140. Usually, the front attachment is normally used as a front mounted cultivator, but as disclosed here it has been adapted to mount tools for the distribution of fertilizer. The cultivator beams 139, on each side of the tractor when the cultivator attachment is used for sowing fertilizer, are tied together by upper and lower tie members 141 and 142, respectively. The upper and lower tie members 141 and 142 are securely clamped to the beams 139 and provide means for tying the beams 139 together, and act as a support for a centrally positioned shovel shank 143 which is securely clamped to the members 141 and 142. Mounted at the lower end of the shovel shank is a cultivator shovel or ground engaging tool 144, or other similar furrow opening device. The beams 139 extend rearwardly and outwardly. Attached to the outer ends of the beams 139 are disk hiller shanks 145 to which are attached disk hillers 146. The shanks 145 are clamped to the beams 139 by clamp brackets 147. Attached to the rear of a cultivator shovel bracket 148 is a fertilizer boot 149. Fertilizer tubes 150 and 151 are attached to the fertilizer boot 149 when the fertilizer attachment is used, as in Figure 1, to sow the fertilizer underneath the seed planted by the planter. When the fertilizer attachment is used to side dress the plant rows, the cultivator standards 143 are mounted at the place where the disk hiller standards are mounted; and, each tube 150 and 151 is connected to its individual furrow opening device 144. After the fertilizer is dispensed through the tubes 150 and 151 to the furrow formed by the furrow opening device 144, the disk hillers 146, which follow the furrow opening device 144, will cover the fertilizer in the furrow formed by the furrow opener 144 sufficiently to prevent the fertilizer from burning the seed, which are later dropped in the furrow by the planter attachment.

As parallel draft links 133, 134 and 135 are used, it is obvious that, as the furrow opening devices are raised and lowered at each adjusted depth, the position of the tools is parallel to their original positions. In order to raise and lower the furrow opening devices, push bars 152 and 153 are mounted on each side of the longitudinally extending narrow frame portion of the tractor. The push bars 152 and 153, as best shown in Figures 1 and 2, are so mounted as to be positioned over the top of the fertilizer hoppers 73 and 73' with sufficient clearance to enable covers 154 for each of the fertilizer hoppers to be removed for the refilling of the fertilizer hoppers. The push bars 152 and 153 extend forwardly to where they are pivotally connected at their forward ends to the bail shaped members 129 at their upper ends. The rear ends of the push bars 152 and 153 extend rearwardly and downwardly to where they are pivotally connected to adjusting levers 155 and 156 mounted on each side of the tractor, and adjacent the operator's station 16. The push bars 152 and 153, with their adjacent parts, provide means for raising and lowering the furrow forming structures. The levers 155 and 156 are pivotally mounted on the quadrant brackets 99. The levers 155 and 156 are adjusted about quadrants 157 and 158 in the usual manner. Pressure rods 159 and 160 connect the push bars 152 and 153 with the plate members 138 for each of the cultivator beams 139. Mounted on each of the pressure rods 159 and 160 are pressure springs 161 providing means for independently exerting pressure in the furrow forming unit and adjusting collars 162 which permit the adjustment of the pressure springs 161. Stop collars 163 are mounted on the upper ends of each of the pressure rods 159 and 160 in order to adjust the working depth of the cultivator tools. The pressure rods 159 and 160 are slidably mounted in socket members 164, and forms a lost motion connection. The socket members 164 are pivotally mounted on a U-shaped arm or reciprocating means 165. Each U-shaped arm 165 is pivotally mounted on a bracket 166 which is supported on the forward end of each of the push bars 152 and 153. Attached to the lower end of the U-shaped arm 165 is a U-shaped spring connecting bracket 167. The spring connecting bracket 167 is mounted underneath each of the push bars 152 and 153, as best shown in Figure 1. Attached at its upper end to each of the spring connecting brackets are tension springs 168 used for counterbalancing the weight of the fertilizer furrow opening and covering devices. The springs 168 are connected at their forward end to spring brackets 169 secured to the transverse draft member 126. It is obvious that, as the levers 155 and 156 are operated that the springs 168 provide means for counterbalancing and acts to counterbalance the weight of the fertilizer furrow opening devices. Also, it is obvious that separate adjustment may be had for each fertilizer furrow opening device on each side of the tractor. Increased pressure may be placed on each of the fertilizer furrow opening devices by each adjusting lever 170 and 171 providing means for adjusting the pressure means, mounted on the push bars 152 and 153, respectively. An adjusting quadrant 172 for each of the adjusting levers 170 and 171 is secured to the push bars 152 and 153. The levers 170 and 171 are pivotally mounted at their lower ends to a forwardly extending portion 173 of the adjusting quadrant 172. Extending forwardly from the levers 170 and 171 are adjusting links 174 which are pivotally connected at their forward ends to the U-shaped spring connecting bracket 167. It is, therefore, obvious that in each locked position of the levers 170 and 171 that the upper ends of each of the balancing springs 168 are held in a fixed position so that as the levers 155 and 156 are actuated the springs 168 act to counterbalance the weight of the fertilizer furrow opening devices 74 and 74'. It is also obvious that as the levers 170 and 171 are actuated that the pressure springs 161 for each of the fertilizer furrow opening units 74 and 74' may be increased or decreased at will depending upon the soil conditions. Additional balancing means for the fertilizer units 74 and 74' are attached to the adjusting levers 155 and 156. The balancing means for each of the levers 155 and 156 comprise a balancing spring or counterbalancing means 175 mounted at its upper end on a spring bracket 176, attached to each of the levers 155 and 156. At their lower ends, the balancing springs are attached by spring links to an extension of the quadrants 157 and 158, respectively. With the tools counterbalanced, in the manner described, it is obvious that very little effort is required by the operator to raise and lower the units 74 and 74'.

It is also apparent from the foregoing description that, after the fertilizer has been sown and the seeds have been planted with this tractor attached planter, that the planter attachments and the fertilizer hopper mechanisms may be detached from the tractor. The fertilizer furrow opener attachments may then be removed and regular cultivator tools can be attached to the cultivator beams 139, and then the front mounted implement attachment may be used as a cultivator attachment. Also, at any time when it is desired to side dress the plant rows with fertilizer, the fertilizer attachment and its furrow opening devices may be attached in place of the cultivator tools, and the front connected implement attachment be used as a fertilizer distributing device to side dress the plant rows.

Figure 3:
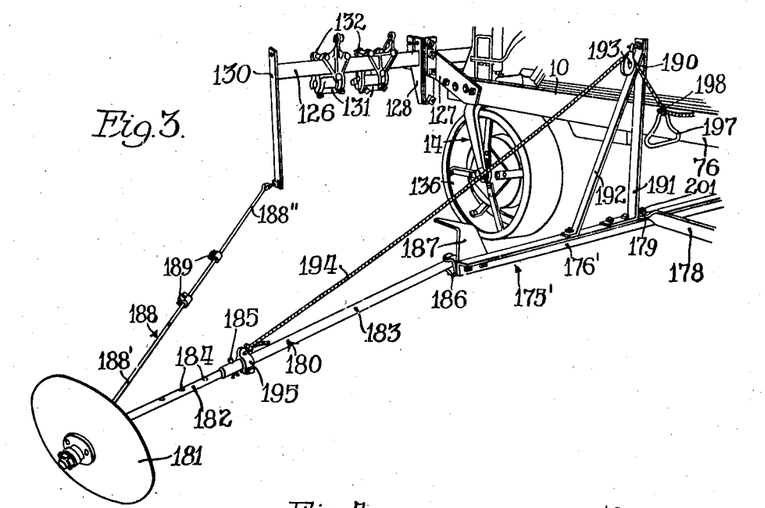
Figure 3 is a perspective view of the means for attaching and operating the marker bar.

A marker bar structure or construction 175', as shown in Figures 1, 2 and 3, provides the necessary marker attachment to lay out the successive plant rows as the tractor attached implement travels down the field. As best shown in Figures 3 and 6, the marker bar construction 175' comprises a transversely extending angle iron frame 176' which extends underneath the midportion of the tractor frame, and laterally of the side sills 76. The angle iron frame 176' is secured to forwardly extending portions 177 and 178 of the thrust members 25 and 26. The members 177 and 178 have a quarter twist 179 forming a horizontal supporting portion to which the member 176' is in abutting relationship providing means for mounting the marker bar structure on the aforesaid thrust members ahead of the transverse draft means 23. Mounted on each end of the angle iron frame 176' are telescoping marker rods 180 which have rotatably mounted at their outer ends a disk marker 181. The telescoping marker rods 180 have an inner telescoping member 182 which is slidably mounted in an outer telescoping member 183. The position of the disk marker is adjusted laterally by means of holes 184 and cotter 185. The marker rod 180 is pivoted by a marker rod bracket 186, pivotally attached to the angle iron frame 176' at its outer end. A stop 187 limits the position of the marker rod 180 in its raised position, as shown in Figures 1 and 3, for transport. An adjustable pull rod 188 is pivotally connected at its forward end, as best shown in Figure 3, to the downwardly extending bracket 130 which is secured to the transverse draft member 126, and at its rear end to the inner telescoping rod 182 adjacent the disk marker 181 and forms a forwardly extending draft connection connecting the outer ends of the telescoping marker arms to the wheel supported frame. The adjusting pull rod 188 is made adjustable by means of the separate rods 188' and 188" and are held in adjusted position by clamps 189. With this adjustable pull rod the angle of the disk marker 181 may be adjusted, and it also acts as a draft connection for the marker. By means of the marker rod bracket 186, the marker 180 is free to have both horizontal and vertical movement. As each of the marker bar constructions are similar for each side of the tractor, only one has been described. Mounted on each end of the angle iron frame 176' and adjacent the side sill 76 of the tractor is an upwardly extending pulley support 190. The pulley support 190 comprises a vertical member 191 and a brace 192 secured to the marker bar frame 175' at laterally spaced points. At the upper end of the pulley support 190 is mounted a pulley 193 which with its support forms means for supporting a rope or means 194 for raising and lowering the marker bar 180, and the rope is attached to a rope-connecting bracket 195 secured to the outer end of the outer telescoping member 183. The rope, as shown in Figure 3, passes over the pulley 193 and extends forwardly, as shown in Figures 1 and 2, to latch brackets 196, secured on each side of the transmission housing 21 adjacent the operator's station 16. A handle 197 may be attached to the rope 194 for ease in manipulation. The marker bar is latched in its raised position by a knot 198 abutting a slotted portion 199 on the bracket 196 through which the rope 194 extends. With this marker bar construction the operator may mark the field in either direction as he traverses the field with the planter attachment.

It is obvious that with the planter attachment, that has been described, a simple planter attachment has been disclosed which may be readily connected to, and disconnected from the tractor. The planter attachment also is obviously a well balanced attachment wherein the planter units themselves are mounted at the rear of the tractor, and the fertilizer units for the tractor are mounted at the forward end of the tractor to thoroughly distribute the weight of the various units. All of the levers for raising and lowering to adjust the various units for the planter attachment are within convenient reach of the operator's station 16. The units are so arranged that when the operator drives the tractor across the field, he may observe how the fertilizer and planting units are functioning. When the operator reaches the end of the row being planted, he may readily raise the marker being used, and lower the other one by actuating the ropes 194 within easy reach. The fertilizer drive mechanism may be thrown in and out of operating position by merely reaching down and operating the lever 97.

As has been previously described, it is obvious that the combined planter attachment comprising the planter units and the fertilizer units may be used as a whole, or that the fertilizer unit or the fertilizer units may be used without the planter units depending upon whether seed is to be planted or fertilizer distributed while the plants are growing. It is also apparent that both the fertilizer units and the planter units may be taken off, and the front attachment structure may be used for attaching cultivator standards and tools for cultivating the plants during the season. With the structure described, it is possible to plant at various row spacings as is necessary in different localities.

In detaching the planter attachment from the tractor in order to attach other implements to the tractor, as best shown in Figure 6, which show the planter attachment detached, a block or other support may be positioned under the transverse draft frame 23. Bolts 200 are then unloosened from the transmission 21 and the supporting members 19 and 20 are then swung to the rear. The swinging bolts 33 and 34 are then loosened and swung clear of the attaching brackets 27' and 28'. If the marker bar structure 175' has not been previously removed, it may be now detached by loosening bolts 201 and sliding the structure forward and dropping it on the ground to then be pulled from underneath the tractor. The tractor may then be driven forward leaving the planter attachment standing, as shown in Figure 6. Next the chain 90 is detached, the fertilizer hopper 73 removed, and set to one side; the next step is to detach the fertilizer hopper frames 75 and 75' from the side sills of the tractor, and place them, as shown in Figure 5. The fertilizer furrow opener device and covering tools may then be removed, if it is desired to, with the front attachment for cultivating and cultivating standards placed on the beams 139, as in standard cultivator practice after removing the tie bars 141 and 142. The beams 139 with their tools are then free to move with respect to each other, and with respect to the tractor.

However, if it is desired to use the tractor for other purposes than cultivating, the entire cultivator unit may be removed by detaching the push bars 152 and 153 from the levers 155 and 156. The levers and their quadrants may or may not be removed from the tractor. The cultivator attachment is then detached from the forward end of the tractor by disconnecting the supports 127 from the front of the tractor. The cultivator attachment can be supported by standards or other supporting structures to maintain the cultivator attachment in its detached position for subsequent attaching.

It will be evident that the construction described results in a simple structure for providing a tractor of a standard type with planting units positioned at the rear of the tractor, fertilizer units positioned at the midportion of the tractor, and fertilizer furrow opening units or cultivator attachment positioned at the forward end of the tractor. It is also apparent that these units may be readily attached to, and detached from the tractor in the manner set forth.

While the construction above described exemplifies one preferred form of the invention, it will be obvious to those skilled in the art, that certain modifications in the structure are possible without departing from the scope of the invention, as defined in the following claims.

What is claimed as new is:

1. The combination with a motor propelled wheel supported frame having a narrow longitudinal body portion, of a fertilizer attachment mounted on the tractor comprising a dispensing mechanism having a hopper construction and a driving mechanism therefor, supporting means for attaching the hopper construction to the body portion comprising a longitudinal support for attaching to the body portion, a transversely extending U-shaped frame mounted thereon for supporting the hopper construction, driving means for the hopper driving mechanism mounted on the aforesaid U-shaped frame, a jack-shaft, means for supporting the jack-shaft on the aforesaid supporting means for attaching the hopper construction, and means for driving the aforesaid driving means from the jack-shaft.

2. The combination with a motor propelled wheel supported frame having a narrow longitudinal body portion, and a transversely extending axle structure, of an implement attachment mounted on the body portion comprising a transverse draft means mounted below the aforesaid body portion intermediate the ends thereof, an implement unit trailed from the aforesaid draft means, longitudinally extending draft means connecting the implement unit with the aforesaid transverse draft means and lying below the aforesaid axle structure, and said longitudinally extending draft means comprising a draft member having a forward transversely extending portion pivoted on the transverse draft means and a rear transversely extending portion pivotally mounted on the implement unit, and a parallel link member bowed downwardly whereby clearance is provided between the aforesaid longitudinally extending draft means and the axle structure.

3. The combination with a motor propelled wheel supported frame having a narrow longitudinal body portion and a transverse axle structure, of a planter attachment comprising means for mounting the planter attachment on the aforesaid transverse axle structure, forwardly extending thrust members, a plurality of planter units, transverse draft means mounted below the aforesaid body portion intermediate the ends thereof, longitudinal draft means for connecting the planter units to the transverse draft means, a marker-bar structure for the aforesaid planter attachment, and means for mounting the marker-bar structure on the planter attachment below the aforesaid narrow longitudinal body portion and intermediate the ends thereof on the longitudinally extending thrust members ahead of the aforesaid transverse draft means.

4. The combination with a motor propelled wheel supported frame having a narrow longitudinal body portion and a transverse axle structure, of a planter attachment comprising means for mounting the planter attachment on the aforesaid transverse axle structure, forwardly extending thrust members, transverse draft means mounted on the aforesaid thrust members, a marker-bar structure for the aforesaid planter attachment, and means for mounting the marker-bar structure on the aforesaid thrust members ahead of the aforesaid transverse draft means.

5. The combination with a motor propelled wheel supported frame having a narrow longitudinal body portion and a transverse axle structure, of a planter attachment comprising means for mounting the planter attachment on the aforesaid transverse axle structure, forwardly extending thrust members, transverse draft means mounted on the aforesaid thrust members below the aforesaid body portion intermediate the ends thereof, a plurality of planter units trailed from the aforesaid draft means, each of said units comprising a hopper and dispensing mechanism therefor positioned to the rear of the axle structure and adjacent thereto, the hoppers of said units lying below the transverse axle structure, longitudinally extending draft means mounted below the axle structure for the planter units comprising parallel link construction, and means for raising and lowering said planter units from ground engaging to transport position.

6. The combination with a motor propelled wheel supported frame having a narrow longitudinal body portion and a transverse axle structure, of a planter attachment comprising means for mounting the attachment on the axle structure, forwardly extending thrust members, transverse draft means mounted on the thrust members below the aforesaid body portion, a plurality of planter units mounted on said transverse draft means, parallel link connections connecting the planter units with the transverse draft means, a transverse rock-shaft, means for connecting the rock-shaft to each of the planter units whereby they may be raised and lowered from ground engaging to transport position and allowing individual movement of each unit in ground engaging position, and means for raising and lowering the planter units from ground engaging to transport position.

7. The combination with a motor propelled wheel supported frame having a narrow longitudinal body portion and a transverse rear axle structure, of a planter attachment mounted on said rear axle structure comprising a plurality of planter units, a transverse draft means mounted below the narrow longitudinal body portion intermediate the ends thereof to which the planter units are connected, a marker-bar structure for the aforesaid planter attachment supported from the wheel supported frame intermediate the ends of the narrow longitudinal body portion, a fertilizer attachment comprising a transverse draft means mounted on the forward end of the longitudinal body portion, fertilizer furrow opening units positioned on each side of the longitudinal body portion and connected to the last mentioned transverse draft means, and means for correspondingly adjusting laterally each of the aforesaid planter units and fertilizer furrow opening units for various row spacings positioned on the aforesaid transverse draft means for the planter units and the aforesaid transverse draft means for the fertilizer furrow opening units.

8. The combination with a motor-propelled, wheel-supported frame having a narrow longitudinal body portion and a transverse axle structure, of a planter attachment comprising quick-attachable means for mounting the attachment on the transverse axle structure, thrust members extending forwardly of the axle structure, a plurality of planter units, transverse draft means carried by the thrust members below the body portion intermediate the ends thereof, longitudinal draft means for connecting the planter units to the transverse draft means, a marker-bar structure, and quick-attachable means for mounting the marker-bar structure on the forwardly extending thrust members.

9. The combination with a wheel supported frame having narrow longitudinal body portion and a transversely extending axle structure, of an implement attachment mounted on the body portion including a transverse draft means adapted to be below the body portion intermediate the ends thereof, an implement unit adapted to be trailed from the draft means, longitudinally extending draft means for connecting the implement unit with the transverse draft means lying below the axle structure, and said longitudinally extending draft means including a draft member, and a parallel link member bowed downwardly, whereby clearance is provided between the longitudinally extending draft means and the axle structure.

10. In combination, a wheel supported frame having a narrow body portion and a transversely extending axle structure, a transverse draft means connected to the wheel supported frame to lie ahead of the axle structure, an implement unit adapted to be trailed from the draft means, and longitudinally extending draft means for connecting the implement unit with the transverse draft means lying below the axle structure, said longitudinally extending draft means including a draft member, and a parallel link member bowed downwardly, whereby clearance is provided between the longitudinally extending draft means and the axle structure.

11. In combination with a wheel supported frame having a narrow longitudinal body portion and a transversely extending axle structure, a transverse draft means connected to the wheel supported frame to lie ahead of the axle structure, an implement structure adapted to lie in rear of the axle structure, and longitudinally extending draft means for connecting the implement unit with the transverse draft means lying below the axle structure and including a draft member having a forward transversely extending portion pivoted on the transverse draft means and a rear transversely extending portion pivotally connected to the implement unit and a parallel link member interconnecting the same and lying above the draft member.

12. In combination with a wheel supported frame having a narrow longitudinal body portion and a transversely extending axle structure, a transverse draft means connected to the wheel supported frame to lie ahead of the axle structure, an implement structure adapted to lie in rear of the axle structure, and longitudinally extending draft means for connecting the implement unit with the transverse draft means lying below the axle structure and including a draft member having a forward transversely extending portion pivoted on the transverse draft means and a rear transversely extending portion pivotally connected to the implement unit and a parallel link member interconnecting the same and bowed downwardly whereby clearance is provided between the longitudinally extending draft means and the axle structure.

13. The combination with a wheel supported frame having a body portion, of a planter attachment comprising means for mounting the planter attachment on the body portion, forwardly extending thrust members, transverse draft means mounted on the thrust members, a marker-bar structure for the planter attachment, and means for mounting the marker-bar structure on the thrust members ahead of the transverse draft means.

14. The combination with a wheel supported frame having a longitudinal body portion, of a dispensing attachment adapted to be mounted on the longitudinal body portion and having a hopper with its operating mechanism, supporting means for the hopper adapted for attachment to the body portion, driving means for the hopper operating mechanism mounted on the supporting means and having a clutch element, means for driving said driving means, and said hopper operating mechanism having a clutch element for engagement with the clutch element of the driving means for the hopper operating mechanism, whereby the hopper operating mechanism can be readily attached to and detached from the driving means upon its attachment and detachment with its supporting means.

15. The combination with a wheel supported frame having a longitudinal body portion, of a dispensing attachment mounted on the frame and having a hopper and an operating mechanism therefor, supporting means for attaching the hopper to the body portion, driving means for the hopper operating mechanism mounted on the supporting means and having a clutch element, a jack-shaft mounted on the supporting means, and means for drivingly connecting said driving means with the jack-shaft, said hopper operating mechanism having a clutch element for engagement with the clutching element of the driving means for the hopper operating mechanism, whereby the hopper operating mechanism can be readily attached to and detached from the driving means upon its attachment and detachment with its supporting means.

JAMES L. HIPPLE.